United States Patent [19]

Ackerman et al.

[11] Patent Number: 5,336,450

[45] Date of Patent: Aug. 9, 1994

[54] PROCESS TO REMOVE RARE EARTH FROM IFR ELECTROLYTE

[75] Inventors: John P. Ackerman, Downers Grove; Terry R. Johnson, Wheaton, both of Ill.

[73] Assignee: The United States of America as represented by the United States Department of Energy, Washington, D.C.

[21] Appl. No.: 999,339

[22] Filed: Dec. 31, 1992

[51] Int. Cl.$^5$ .............................................. G21F 9/00
[52] U.S. Cl. ................... 423/21.1; 423/155; 423/179; 423/250; 423/251; 423/253; 588/1
[58] Field of Search ............. 252/626, 627; 423/5, 423/21.1, 155, 179, 250, 251, 253; 204/1.5; 75/398, 399, 397, 346

[56] References Cited

U.S. PATENT DOCUMENTS

| | | |
|---|---|---|
| 2,951,793 | 9/1960 | Hansen . |
| 4,596,647 | 6/1986 | Miller et al. .................... 204/212 |
| 4,814,046 | 3/1989 | Johnson et al. .................. 204/1.5 |
| 4,880,506 | 11/1989 | Ackerman et al. ............... 204/1.5 |
| 5,096,545 | 3/1992 | Ackerman ........................ 204/1.5 |

Primary Examiner—Donald P. Walsh
Assistant Examiner—Ngoclan T. Mai
Attorney, Agent, or Firm—Robert J. Fisher; Hugh W. Glenn; William R. Moser

[57] ABSTRACT

The invention is a process for the removal of rare earths from molten chloride electrolyte salts used in the reprocessing of integrated fast reactor fuel (IFR). The process can be used either continuously during normal operation of the electrorefiner or as a batch process. The process consists of first separating the actinide values from the salt before purification by removal of the rare earths. After replacement of the actinides removed in the first step, the now-purified salt electrolyte has the same uranium and plutonium concentration and ratio as when the salt was removed from the electrorefiner.

14 Claims, 1 Drawing Sheet

PROCESS TO REMOVE RARE EARTH FROM IFR ELECTROLYTE

CONTRACTUAL ORIGIN OF THE INVENTION

The United States Government has rights in this invention pursuant to Contract No. W-31-109-ENG-38 between the U.S. Department of Energy and Argonne National LABORATORY.

BACKGROUND OF THE INVENTION

This invention relates to a method of purifying molten chloride salts used in the reprocessing of Integral Fast Reactor (IFR) fuel. More specifically the invention relates to a process of removing rare earths fission products from mixed chloride salts used in the electrolytic reprocessing of irradiated IFR fuels.

The Integral Fast Reactor (IFR) is a sodium-cooled, fast reactor using metallic alloys of uranium, plutonium and zirconium as fuel, and having a close-coupled fuel cycle. Close-coupling of the reactor and the fuel cycle facilities can be achieved by locating on one site the reactor and the facilities for reprocessing spent fuel, fabricating recovered fuel, and managing fission product wastes. With this arrangement, it is not necessary to ship fuel to or from the reactor site. Alternatively, spent fuel from several reactors could be treated at a central facility. In either case, reducing the volume of waste product produced from fuel reprocessing is inherent in and required by the IFR concept.

The recovery of fissionable materials such as uranium and plutonium from spent nuclear reactor fuels can be carried out by electrorefining methods using electrochemical cells of the type described in U.S. Pat. Nos. 4,596,647 and 2,951,793, as well as U.S. Pat. No. 4,880,506. It is the electrorefining method which is being developed for the reprocessing of IFR fuel. In a typical electrorefining cell an electrolyte consisting of a molten chloride salt mixture, such as the eutectic mixture of LiCl and KCl, is used to transport the metal or metals to be purified from anodes to cathodes. When used to reprocess spent nuclear reactor fuels, the salt mixture eventually becomes contaminated with radioactive rare earth metals which causes excessive heat built-up and contamination of the uranium or plutonium product salt such that eventually the salt is no longer suitable for use in the electrorefining cell.

Previously, the design for salt purification and removal of rare earths was based on a series of individual batch operations utilizing extracting agents such as Cd-U solutions and reducing agents such as Li-Cd alloys or Li-K-Cd alloys in order to recover actinides and isolate the rare earths in a metal waste matrix, all as previously disclosed in the Johnson et al. U.S. Pat. No. 4,814,046. This process required that the electrorefining process be shut down. This increased considerably the overall time to reprocess spent fuel and required use of the electrorefiner for certain of the operations.

A new process has been developed which operates external to the electrorefiner to rapidly treat at least a portion of the electrolyte salt in a series of steps to remove the rare earth contaminants from the salt while leaving the salt in such a condition that it can be recycled directly back into the electrorefiner with the recovered actinides.

SUMMARY OF THE INVENTION

As used herein, the phrase; "rare earth fission product values" includes yttrium and the lanthanide fission product elements while the phrase; "transuranic values", or TRU values includes neptunium, plutonium, americium and curium values.

The invention is a semicontinuous process for purifying a molten chloride salt electrolyte by preferentially separating rare earth fission product wastes from the salt when it contains these elements together with uranium, plutonium, and minor actinide values such as neptunium, americium and curium, by contacting the salt with a molten cadmium metal solution containing a reductant, whereby most of the uranium, plutonium and minor actinide values together with a small fraction of the rare earth values are reduced and taken up by the cadmium metal while small amounts of uranium, plutonium, the minor actinides, and most of the rare earth values remain in the salt, separating the molten cadmium metal reductant solution from the salt, contacting the salt with a molten metal extractant solution containing uranium metal whereby the uranium displaces most of the plutonium and minor actinide values remaining in the salt which are taken up by the cadmium metal, separating the salt from the molten cadmium metal extractant solution and contacting the molten salt, with a molten cadmium metal strip solution, containing lithium, whereby the lithium reduces the rare earths and uranium remaining in the salt to the metals which are taken up by the molten cadmium metal strip solution, separating the cadmium metal strip solution containing the rare earths and uranium from the molten salt, mixing the purified molten salt with an oxidant to form an oxidizing salt, mixing the molten cadmium metal reductant and the molten cadmium metal extractant solutions together to form an actinide return stream, contacting the oxidizing salt with the actinide return stream, whereby the plutonium, uranium, and other values in the actinide return stream are oxidized to the chloride salts and taken up by the salt and separating the salt from the molten cadmium solution, thereby forming a molten chloride electrolyte salt purified of rare earth fission product values and containing the proper ratio and quantity of uranium and plutonium ready to be recycled back into the electrorefiner.

The process as described herein can be used as a continuous process for the purification of the salt by diverting a portion of the salt as is flows from the electrorefiner, or it may be operated as a batch process for removing rare earths from the electrorefiner salt on a "as needed" basis.

It is therefore one object of the invention to provide a process for purifying molten chloride electrolyte salts.

It is another object of the invention to provide a faster process than a prior art batch processes for purifying molten chloride electrolyte salt, It is yet another object of the invention to provide a process for selectively separating rare earth fission products from a molten chloride electrolyte salt containing these values together with uranium, plutonium and minor actinide values such as americium, curium and neptunium.

It is still another object of the invention to provide a process for removing rare earth fission product values from a molten chloride electrolyte salt so that the salt can be recycled back into the electrorefiner without additional processing.

Finally, it is the object of this invention to provide a process for selectively removing rare earth fission product values from a molten salt electrolyte which can be operated continuously rather than be operated as a batch process.

BRIEF DESCRIPTION OF THE DRAWINGS

The FIGURE is a flow diagram of the process of the invention.

DETAILED DESCRIPTION OF THE PREFERRED EMBODIMENT

Figure 1:
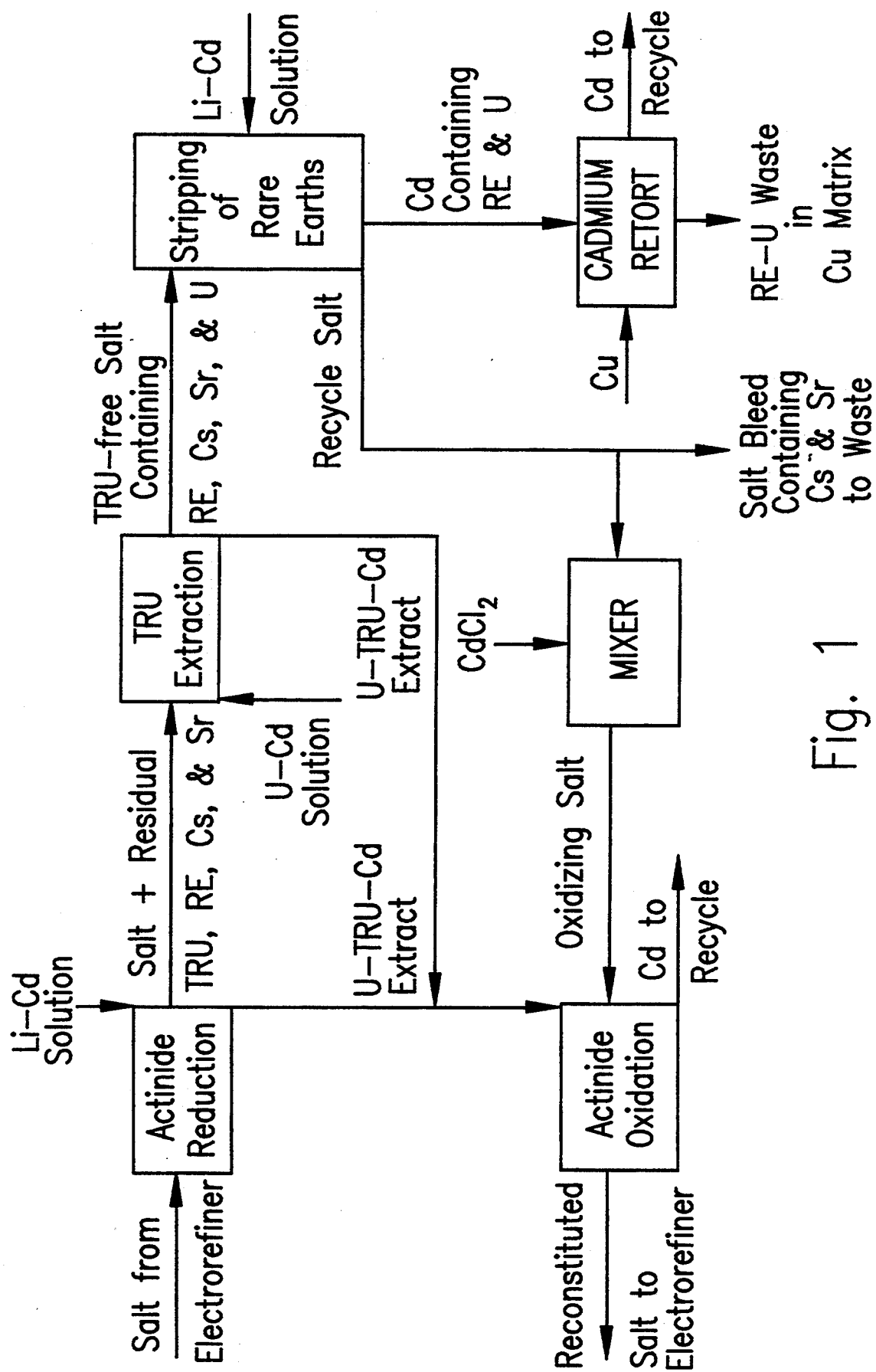

These and other objects of the process for purifying a molten chloride salt electrolyte of rare earth fission product values can be seen by referring to the single drawing. The molten chloride electrolyte salt from the electrorefiner containing the uranium, TRU, and rare earth values, together with other fission product values, such as cesium and strontium, is contacted with a molten cadmium metal reductant solution containing about 3 atom % lithium whereby most of the uranium and TRU values, i.e. plutonium, neptunium, americium and curium, in the salt are reduced and taken up by the cadmium solution leaving only minor amounts of the TRU values in the salt together with most of the rare earth and other fission product values. After separation from the reductant solution now containing the uranium and TRU values, the salt is contacted with an extractant consisting of molten cadmium containing about 1 atom % uranium whereby the uranium in the cadmium displaces the TRU's remaining in the salt which report to the extractant solution leaving the rare earth values together with the uranium, cesium and strontium values in the salt. After separation from the molten cadmium extractant, the salt now free of TRU's, is contacted with a molten cadmium strip solution containing lithium, the amount of lithium being a slight excess of the stoichiometric amount necessary to reduce the remaining rare earth and uranium values in the salt, whereby the rare earth and uranium values report to the molten cadmium strip solution while the cesium and strontium values remain in the now purified salt. A quantity of salt equal to the amount of salt formed during the previous reactions may be removed or bled from the main body of salt at this time and sent to waste so that the total quantity of salt remains the same as the quantity of salt taken from the electrorefiner for purification. The cadmium reductant and the cadmium extractant streams are combined to form an actinide return stream. The remaining purified salt is mixed with an oxidant to form an oxidizing salt, the oxidant which may consist of cadmium chloride or uranium chloride, is present in a slight excess of the amount necessary to oxidize the actinides and any rare earths remaining in the actinide return stream. The oxidizing salt and the actinide return stream are then mixed together whereby the uranium, and TRU in the actinide return stream are oxidized to the chloride salt and report to the molten salt electrolyte. The molten salt electrolyte is now sufficiently purified of rare earth fission product values, contains the same uranium and plutonium quantity and ratio as when it originally came from the electrorefiner and is thus ready to be recycled back to the electrorefiner to process additional irradiated nuclear fuel.

The cadmium from the reductant solution containing the rare earth values and uranium and from the actinide oxidation can be recovered by distillation and recycled. The uranium can be separated from the rare earth values and reused leaving only the rare earths for which appropriate storage must be provided.

The electrolytic salt is a mixture of alkaline earth or alkali metal chlorides, except beryllium and magnesium, that has a low melting temperature and in which chlorides of the rare earth fission products and the transuranic elements have high solubilities. The salt then is a mixture of one or more chlorides of lithium, sodium, potassium, calcium, strontium, and barium that are thermodynamically more stable than rare earth and actinide chlorides. For example, a salt consisting of about 23 wt % LiCl, about 35 wt % $BaCl_2$, about 32 wt % $CaCl_2$ and about 10 wt % NaCl, and a eutectic mixture of KCl and 44 wt % LiCl have been found satisfactory. However, any number of different combinations of chloride salts meeting the above criteria will be satisfactory.

The molten electrolyte salt, as it comes from the electrorefiner contains about 0.6 mol % uranium, 1.4 mol % plutonium, 0.01 mol % minor actinides and about 1.2 mol % rare earth fission product values.

The reductant solution consists of lithium in molten cadmium metal. The amount of lithium in the reductant solution is the stoichiometric amount necessary to reduce all of the actinides in the salt while amount of cadmium is such that the concentrations of uranium, TRU and rare earths remain low enough that these elements can be dissolved in the resulting cadmium solution. This may vary from about 3 to 10 atom % lithium in cadmium metal. This amount should reduce more than 99.7% of the uranium, 97.7% of the plutonium, and about 91% of the minor actinides in the salt, which then report to the cadmium metal. A lithium concentration greater than about 10 atom % may reduce the rare earth fission product values present in the salt causing these values to be taken up by the cadmium metal so that they will no longer be recoverable from the molten salt.

The extractant solution consists of about 0.5 to 2.3 wt % uranium metal in molten cadmium. The solubility of uranium in cadmium depends upon the temperature of the molten cadmium. For example, at 500° C., cadmium is saturated with about 2.3 wt % uranium. Preferable the extractant will contain about 2.0 wt % uranium in order to obtain the best results since uranium concentration in the metal also affects the distribution ratios of the rare earth and transuranic values.

Contact temperatures of the rare earth recovery process must be at least above the melting temperature of the extractant alloy and the salt and below the temperature at which components begin to vaporize sufficiently to interfere with equipment operation. The temperature may vary from about 400° C., depending on salt composition to about 600° C. Generally, a temperature of about 500° C. has been found satisfactory.

Contact times are not critical, since the reactions proceed rapidly once contact between the salt and metal phases has been made. The actual extraction operation can be carried out as a batch process or continuous operation, using, for example simple mixing tanks, mixed settlers, occurrent or countercurrent flow columns, centrifugal contactors or similar conventional type equipment known to those skilled in the art.

The strip solution is molten cadmium metal containing at least a stoichiometric amount of lithium necessary to react with the uranium and rare earths in the salt. Preferably an excess of from 1 to 10% of the stoichiometric amount is preferred to ensure that all of the rare earths and uranium present in the salt are reduced.

Upon separation, the cadmium containing the rare earths and uranium can be sent to waste, or the cadmium can be recovered from the rare earths by retorting and reused, and the rare earths and uranium sent to waste.

A quantity of the now purified salt, equal to the amount of salt which was produced during the purification processing by the reaction of lithium and chloride is preferably sent to waste in order to maintain the same quantity of salt as was originally received from the electrorefiner.

The molten reductant and extractant solutions are mixed together to form an actinide return stream, in order to provide a means for the recovery of the uranium and plutonium values found in the cadmium streams which were separated from the molten salt.

An oxidant, which may be either cadmium chloride or uranium chloride, is now mixed with the remaining purified salt to form an oxidizing salt. The amount of oxidant in the salt being a slight excess of the amount necessary to react stoichiometrically with the actinides and rare earths in the actinide return stream.

After contact between the oxidizing salt and the actinide return stream, the actinides and any rare earths remaining in the cadmium are oxidized to the chloride salt and taken up by the salt, thereby reconstituting the electrolyte salt by returning the salt to its original composition with regard to uranium and plutonium content and uranium to plutonium ratio.

After separation, the salt is now ready for recycle back into the electrorefiner to continue to reprocess irradiated nuclear reactor fuel while the cadmium metal can also be recycled for reuse.

The weight ratio of salt to extractant metal and the number of extraction stages will depend to some extent on the degree of separation required in the extraction of TRU values from the salt using uranium. A larger number of stages will give better separation. A larger U/salt ratio will extract TRU's more completely, but will also extract more rare earths and return more uranium to the electrorefiner. Generally 3 or 4 theoretical stages will be sufficient in conjunction with a stoichiometric ratio of uranium to TRU's of about 8.

Following is a simulated example given to illustrate the process of the invention. The example is not to be taken as limiting the scope or extent of the invention which is set forth in the appended claims.

EXAMPLE

The composition of the molten chloride salt electrolyte as it comes from the electrorefiner is given in Table 1. The amount of salt in all tables is 6800 moles unless otherwise noted and the quantity of the various elements in the salt is given in moles.

TABLE I

APPROXIMATE SALT COMPOSITION AS IT EXITS THE ELECTROREFINER AND BEFORE RARE EARTH REMOVAL

| | | |
|---|---|---|
| U | 40 | moles |
| Pu | 90 | |
| Minor actinides (Np, Cm, Am) | .8 | |
| Rare earths | 80 | |

In the reduction simulation, four theoretical stages are modeled using 100% of the stoichiometric amount of lithium required to reduce all the actinides, but not the rare earths. The lithium was introduced as a 6 at % solution in cadmium (85 to 95 liters at room temperature). The contactor input and output compositions are presented in Table 2.

TABLE 2

Stream Compositions: Reduction Bank of Pyrocontactors
4-stage contact

| | SALT | | | METAL | | |
|---|---|---|---|---|---|---|
| | input | output | % change | input | output | % change |
| Cd | 0.0 | | | 6646.0 | 6646.0 | 0.0 |
| U | 42.41 | .08748 | −99.79% | 0.0 | 42.32 | |
| Pu | 88.15 | 1.954 | −97.78% | 0.0 | 86.19 | |
| Minor Actinides | .791 | .06425 | −91.88% | 0.0 | .7291 | |
| R.E. | 77.09 | 75.07 | −2.62% | 0.0 | 2.023 | |

Note that any rare earths reduced in this contact return to the electrorefiner. Excess reductant in this bank will just return excess rare earths to the electrorefiner. If too little reductant is used, an excess amount of uranium equivalent to any unreduced actinides will show up in the metal waste. Because rare earth removal is more effective than is required by the process, a slight excess of reductant is probably preferred in this step. This step is a "titration" step that is dependent on accurate analysis and control of the streams.

EXTRACTION

The extraction step uses an excess of uranium to effect removal of nearly all the TRU chlorides from the salt. This has the effect of forcing the equilibrium in reaction 1 to the right.

Reaction 1. U(Cd)+TRU(Cl₃)⇌TRU(Cd)+UCl₃

This is particularly effective in multistage countercurrent extraction so there are a large number of stages in this step. The salt output has very low TRU content as it is fed to the stripper. The unreacted uranium and the actinides and rare earths that are extracted from the salt are stored in the U-TRU tank for contact with the oxidizing salt in the final step.

The excess uranium in the output metal stream of the extraction bank is returned to the electrorefiner as uranium chloride after oxidation in the final bank. If the amount of excess uranium is kept low it should be comparable to the amount of active metal (rare earths, alkali and alkaline earth metals) in the feed that must be oxidized, so there is no buildup of actinide chlorides in the salt. If the amount of uranium chloride in the return to the electrorefiner is too small to effect the necessary active metal oxidation, excess CdCl₃ can be added, but it is preferable to return UCl₃ because excess uranium has a favorable effect on the extraction bank. Table 3 shows extraction stream composition when various amounts of uranium extractant are used.

TABLE 3

Stream Compositions: Extraction Bank of Pyrocontactors
189 liters of salt, 8 theoretical stages

| | SALT | | | METAL | | |
|---|---|---|---|---|---|---|
| | input | output | % change | input | output | % change |
| | | 10.0 liters 1 at % uranium | | | | |
| Cd | 0.00 | 0.00 | | 761.5 | 761.5 | 0.00% |
| U | .0002434 | 4.481 | | 7.615 | 3.137 | −58.81% |
| Pu | .005755 | .0006 | −98.25% | 0.00 | .005704 | |
| Minor Actinides | .0002417 | .0000338 | −85.98% | 0.00 | .0002088 | |
| R.E. | 70.61 | 66.14 | −6.34% | 0.00 | 4.471 | |
| | | 15.0 liters 1 at % uranium | | | | |
| Cd | 0.00 | 0.00 | | 1142.0 | 1142.0 | 0.00% |
| U | .0002434 | 5.699 | | 11.42 | 5.724 | −49.89% |
| Pu | .005755 | .00002674 | −99.54% | 0.00 | .005737 | |
| Minor Actinides | .0002417 | .00001678 | −93.05% | 0.00 | .0002255 | |
| R.E. | 70.62 | 64.93 | −8.06% | 0.00 | 5.692 | |
| | | 20.0 liters 1 at % uranium | | | | |
| Cd | 0.00 | 0.00 | | 1523.0 | 1523.0 | 0.00% |
| U | .0002434 | 6.718 | | 15.23 | 8.512 | −44.11% |
| Pu | .005755 | .00001005 | −99.83% | 0.00 | .005749 | |
| Minor Actinides | .0002417 | .000009095 | −96.24% | 0.00 | .0002331 | |
| R.E. | 70.62 | 63.91 | −9.50% | 0.00 | 6.711 | |

Since there are about 6800 moles of salt, theoretical output TRU concentrations are <<1 ppm. The amount of cadmium is not critical to the extraction process as long as there is sufficient to dissolve all the necessary uranium. If required, the metal extractant could be more dilute. The 15 liter case output was used to simulate input to the scrub stage.

Strip:

Rare earth removal is effected in the strip bank. This is another "titration" step, but the metal product is waste, so a small excess of lithium can be tolerated. If a substoichiometric amount of lithium is used some rare earths "get through" and return to the electrorefiner and the waste salt is more radioactive because the rare earths add to the cesium and strontium already in the salt waste. The TRU levels coming to the strip stage are already low, and the TRU is reduced to a larger extent than the rare earths, so TRU contamination of waste is not a problem. Multiple contact stages in this bank effect a more complete reduction of europium and samarium because the exit salt has "seen" several stages of nearly pure Li-Cd. In Table 4 below, the effect of multiple stages with just under 3% excess of reductant is shown.

TABLE 4

Stream Compositions: Scrub Bank of Contactors
189 liters of salt, 50.0 liters 6 at % lithium (72.6 moles) in cadmium of multiple stages with just under 3% excess of reductant is shown.

| | SALT | | | METAL | | |
|---|---|---|---|---|---|---|
| | input | output | % change | input | output | % change |
| | | 1 stage | | | | |
| Cd | 0.00 | 0.00 | | 3628.0 | 3628.0 | 0.00% |
| Li | 3919.0 | 4134.0 | 5.48% | 217.6 | 2.854 | −98.69% |
| U | 5.699 | <1 ppb | −100.00% | 0.00 | 5.699 | |
| Pu | .00002674 | <1 ppb | −100.00% | 0.00 | .00002674 | |
| Minor | .00001678 | <1 ppb | −100.00% | 0.00 | .00001678 | |
| R.E. | 64.93 | 1.51 | −97.68% | 0.00 | 63.42 | |
| | | 4 stages | | | | |
| Cd | 0.00 | 0.00 | | 3627.0 | 3627.0 | 0.00% |
| Li | 3919.0 | 4134.0 | 5.48% | 217.6 | 2.917 | −98.99% |
| U | 5.699 | <1 ppb | −100.00% | 0.00 | 5.699 | |
| Pu | .00002674 | <1 ppb | −100.00% | 0.00 | .00002674 | |
| Minor | .00001678 | <1 ppb | −100.00% | 0.00 | .00001678 | |
| R.E. | 64.93 | .0588 | −99.09% | 0.00 | 64.34 | |
| | | 8 stages | | | | |
| Cd | 0.00 | 0.00 | | 3627.0 | 3627.0 | 0.00% |
| Li | 3919.0 | 4134.0 | 5.48% | 217.6 | .004762 | −100.00% |
| U | 5.699 | <1 ppb | −1000.00% | 0.00 | 5.699 | |
| Pu | .00002674 | <1 ppb | −100.00% | 0.00 | .00002674 | |
| Minor Actinides | .00001678 | <1 ppb | −100.00% | 0.00 | .00001678 | |
| R.E. | 64.93 | .0562 | −99.13% | 0.00 | 70.29 | |

The lanthanides that the model predicts to remain in the salt are most of the europium and about 1% of the samarium. The salt output from the fourstage bank simulation is used for simulation of the input to the oxidation contactor.

Oxidation:

Salt (9.4 liters in this simulation) is discarded, then cadmium chloride (here 226 mole, ~1% excess) is mixed with the salt, then the oxidizing salt is re-contacted with the metal from the reduction and extraction steps. The salt output of this step is reintroduced into the electrorefiner: the metal is virtually pure cadmium that is re-used in this salt purification loop. Relative to the "dirty" salt entering the salt purification loop, this "purified salt has much lower rare earth concentrations, a slightly higher uranium chloride concentration, and possible some excess cadmium chloride. Relative to the active (alkali, alkaline earth) and TRU metals in the next fuel batch to be introduced to the electrorefiner, both uranium chloride and cadmium chloride are oxidizing agents. The active metals will reduce the cadmium chloride, then the uranium chloride. Ideally, the salt returning to the electrorefiner would contain enough uranium and/or cadmium chloride to just balance the rare earth and active metals in the feedstock processed in the same time that the loop runs. Like the amount or cadmium chloride used in the present reference flowsheet, the amount of oxidizing chlorides returned to the electrorefiner is non-critical within fairly wide limits. Table 5 shows the simulated stream compositions into and out of a four-stage oxidation bank.

TABLE 5

Stream Composition of the Oxidation Bank of contactors 189 liters of salt, 106 liters of metal, four stages.

|  | SALT | | | METAL | | |
| --- | --- | --- | --- | --- | --- | --- |
|  | input | output | % change | input | output | % change |
| Cd | 23.00 | 6.131 | −97.33% | 8034.0 | 8258.0 | 2.79% |
| Li | 3928.0 | 3928.0 | 0.00% | 0.00 | 0.00 |  |
| U | 0.00 | 48.14 |  | 48.14 | <1 ppb | −100.00% |
| Pu | 0.00 | 88.19 |  | 88.19 | <1 ppb | −100.00% |
| Minor Actinides | 0.00 | .07922 |  | .07922 | <1 ppb | −100.00% |
| R.E. | .05588 | 12.68 | +2169.75% | 12.12 | <1 ppb | −100.00% |

As has been demonstrated by the preceding discussion and example, the process of the invention provides an efficient and effective process for purifying molten electrolytic chloride salt of undesirable rare earth elements.

While there has been disclosed what is considered to be the preferred embodiment of the present invention, it is understood that minor changes in the detail may be made without departing from the spirit, or sacrificing any of the advantages of the present invention.

The embodiment of the invention in which an exclusive property or privilege is claimed is defined as follows:

1. A process for purifying a molten chloride salt electrolyte of rare earth fission product values when these values are contained in the salt together with uranium, plutonium, cesium, strontium and minor actinide values selected from the group consisting of neptunium, americium and curium, comprising:

contacting the salt with a molten cadmium metal reductant solution whereby most of the uranium, plutonium and minor actinide values together with some of the rare earth values are reduced and taken up by the cadmium metal while minor amounts of uranium, plutonium, minor actinides, and most of the rare earth values remain in the salt together with the cesium and strontium, separating the molten cadmium metal reductant solution from the salt, contacting the salt with a molten cadmium metal extractant solution containing uranium metal whereby the uranium displaces most of the remaining plutonium and minor actinide values remaining in the salt which are taken up by the cadmium metal, separating the salt from the molten cadmium metal extractant solution, contacting the molten salt with a molten cadmium metal strip solution containing lithium whereby the lithium reduces the rare earths and uranium remaining in the salt, said reduced rare earths and uranium being taken up by the molten cadmium metal strip solution, thereby purifying the salt of rare earths, separating the cadmium metal strip solution containing the rare earths and the uranium from the molten purified salt, mixing the molten purified salt with an oxidant to form an oxidizing salt, mixing the molten cadmium reductant and molten cadmium extractant solutions to form an actinide return stream, and contacting the oxidizing salt with the actinide return stream whereby the plutonium, uranium and other values in the cadmium solution are oxidized to the chloride salt and taken up by the salt, thereby forming a purified molten chloride electrolyte salt suitable for recycling.

2. The process of claim 1 wherein the electrolyte salt is a chloride mixture of alkali metals or alkaline earth metals other than beryllium and magnesium.

3. The process of claim 2 wherein the molten electrolyte is the eutectic of LiCl and KCl.

4. The process of claim 1 wherein the molten cadmium reductant solution contains lithium metal and the amount of lithium in the solution is a stoichiometric amount sufficient to reduce the actinides in the salt.

5. The process of claim 4 wherein the molten cadmium solution contains from about 3 to 10 atom percent lithium metal.

6. The process of claim 1 wherein the molten cadmium extraction solution contains from about 0.5 to about 2.3 wt. % uranium.

7. The process of claim 6 wherein the molten cadmium strip solution contains a slight excess of the stoichiometric amount of lithium necessary to react with the rare earths and uranium in the salt.

8. The process of claim 7 wherein a portion of the purified salt is sent to waste before being mixed with the oxidant.

9. The process of claim 8 wherein the amount of salt sent to waste is equal to the amount of salt formed during the purifying process by reaction between lithium metal and chloride from the salt.

10. The process of claim 9 wherein the oxidant is selected from the group consisting of cadmium chloride and uranium chloride.

11. The process of claim 10 wherein the oxidant is a stoichiometric amount of salt selected from the group consisting of cadmium chloride and uranium chloride necessary to oxidize the actinides and rare earths in the actinide stream to the chloride salt.

12. The process of claim 1 wherein each of the contacting steps is performed with molten cadmium metal solution at a temperature of between about 400° and 600° C.

13. A process for purifying a molten chloride salt electrolyte, discharged from an electrorefiner, of rare earth fission product values when these values are contained in the salt together with uranium, plutonium, cesium, strontium, and the minor actinide values selected from the group consisting of neptunium, americium and curium, comprising:

contacting the salt with a molten cadmium metal reductant solution containing from about 3 to about 10 atom % lithium, whereby most of the uranium, plutonium and the minor actinides values together with some of the rare earth values are reduced and taken up by the cadmium metal while minor amounts of uranium, plutonium, minor actinides, and most of the rare earth values remain in the salt together with the cesium and strontium, separating the molten cadmium metal reductant solution from the salt, contacting the salt with a molten cadmium metal extractant containing from about 0.5 to about 2.3 wt % uranium metal whereby the uranium displaces most of the remaining plutonium and minor actinide values remaining in the salt which are taken up by the cadmium metal, separating the salt from the molten cadmium metal extractant solution, contacting the molten salt with a molten cadmium metal strip solution containing lithium, the amount of lithium in the solution being a slight excess of the amount necessary to react with the rare earths and uranium in the salt, whereby the lithium reduces the rare earths and uranium remaining in the salt, said reduced rare earths and uranium being taken up by the molten cadmium metal strip solution, thereby purifying the salt, separating the cadmium metal strip solution containing the rare earths and uranium from the molten purified salt, removing a portion of the purified salt to be sent to waste, the amount of salt removed being equal to the amount of salt formed during the preceding purification process steps by reaction between lithium and chloride, mixing the molten cadmium reductant and molten cadmium extractant solutions to form a actinide return stream, mixing the molten purified salt with an oxidant selected from the group consisting of cadmium chloride and uranium chloride to form an oxidizing salt, the amount of oxidant being in slight excess of the amount necessary to react stoichiometrically with the actinides and rare earths in the molten actinide return stream, contacting the oxidizing salt with the actinide return stream whereby the plutonium, uranium and other values in the cadmium solutions are oxidized to the chloride salt and taken up by the salt, thereby forming a purified molten chloride electrolyte salt suitable for recycling, separating the purified salt from the cadmium solution, and recycling the purified molten chloride electrolyte salt back into the electrorefiner.

14. The process in claim 1 wherein said molten chloride electrolyte salt is discharged from an electrorefiner and is returned after purification to the electrorefiner.

* * * * *